Oct. 24, 1961

F. W. McGUGIN ET AL 3,005,288

METHOD AND APPARATUS FOR TREATING SOILS BY ADDING CARBONIC ACID

Filed Jan. 26, 1959

FRANK W. McGUGIN
JOEL HEDGPETH
INVENTORS

HUEBNER & WORREL
ATTORNEYS

BY Richard M. Worrel

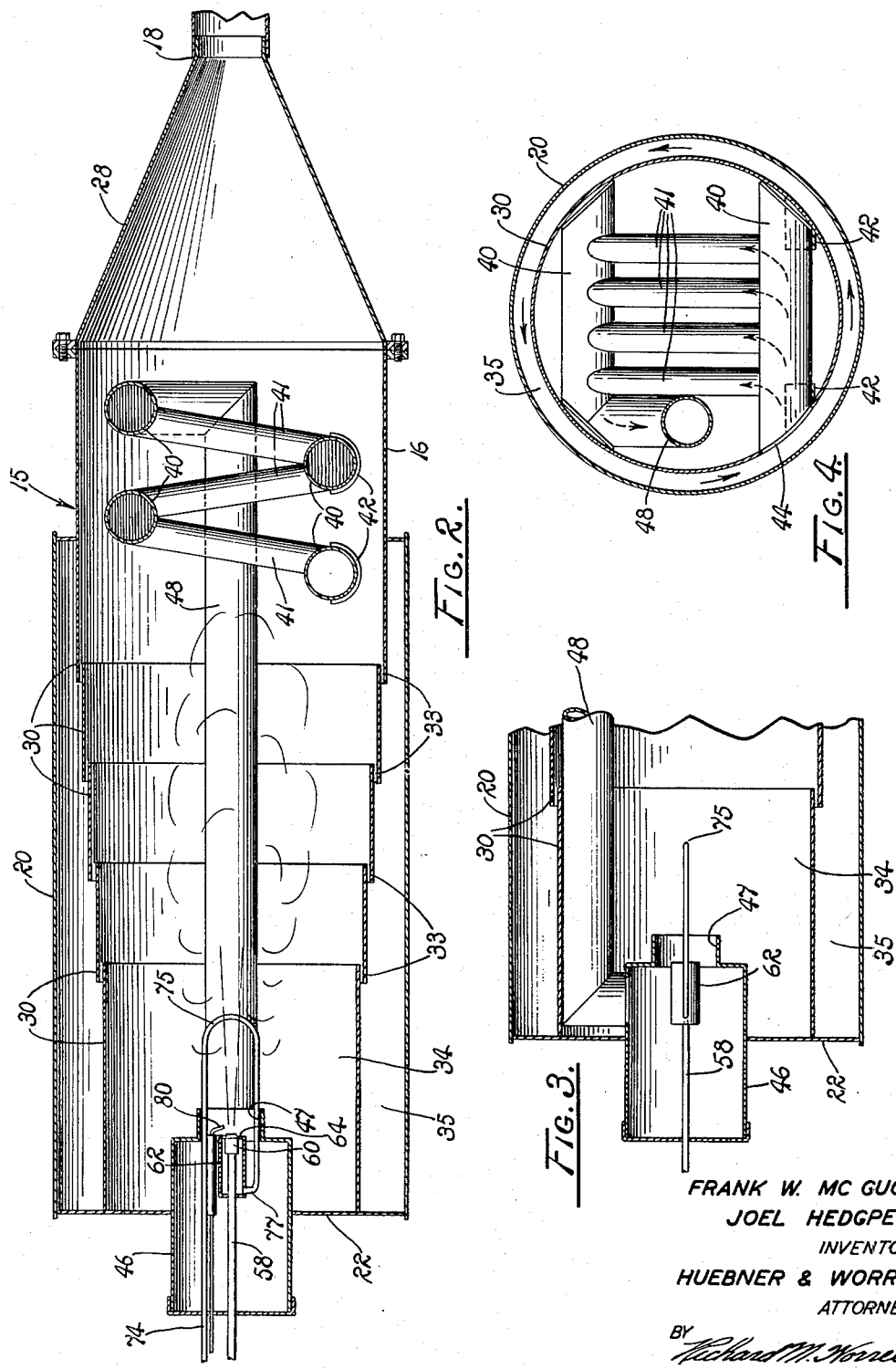

United States Patent Office 3,005,288
Patented Oct. 24, 1961

---

3,005,288
METHOD AND APPARATUS FOR TREATING SOILS BY ADDING CARBONIC ACID
Frank W. McGugin and Joel Hedgpeth, Fresno, Calif., assignors to $CO_2$ Land Healers, Inc., Fresno, Calif., a corporation of California
Filed Jan. 26, 1959, Ser. No. 789,177
16 Claims. (Cl. 47—58)

The present invention relates to a method and apparatus for treating soils and more particularly to the making and applying of carbonic acid for minimizing or correcting of damage to soils, pumps, irrigation pipe lines and the like incident to the accumulation of alkaline materials.

It is well recognized that certain alkaline soils have a high content of exchangeable sodium ions. If not counteracted or replaced, the sodium ion has an adverse effect on soil productivity. The combination of sodium ions and high pH has a toxic action on roots and, under extreme conditions, may dissolve organic matter in addition to the roots.

Further, good soil management requires the maintenance of proper soil aggregates formed by flocculation of soil particles. Where the soil particles are dispersed or deflocculated, the resulting soil conditions are unfavorable to plant growth. It is known that alkaline soils, where exchangeable sodium predominates, are deflocculated, have low permeability, and are compacted. Several theories are advanced for the cause of these conditions. One such theory holds that the sodium ions cause the soil particles to assemble into impervious parallel platelets when in solution and to remain this way upon drying. The result, after a series of wet and dry periods, is a stratification of the soil into stacked, relatively water impenetrable, layers. Another theory is that a high percentage of exchangeable sodium in the soil promotes deflocculation of aggregates and swelling of soil particles to compress the particles into tightly packed condition thereby to seal off further movement of water into the soil. Whatever action takes place, this characteristic of alkaline soil exists and is know to be overcome in some degree by the removal of exchangeable sodium from the soil.

In the amendment of alkaline soils in the past, however, the principle of base exchange has been employed to neutralize or acidulate the soil and to reduce the sodium ion content thereof. The principal purpose of such amendments has been to furnish soluble calcium to replace exchangeable sodium. Limestone, gypsum, sulfuric acid, and sulfur have been employed to advantage as sources of calcium either inherently or when added to the soil. After the base exchange takes place, the released sodium is carried away by extra irrigation water working its way downwardly into the soil. The aggregate structure of the resulting calcium soils are in an improved condition and found to be granulated and porous.

At the present time there exist vast acreages of land in the west, and other parts of the United States, which would be ideally suited for farming, except for the alkaline character of their soils. This is evidence that known methods and materials for reducing alkalinity are either unsatisfactory or uneconomical, especially on a large scale and/or on a continuously recurrent basis.

Another important problem of soil management is supplying the soil with nitrogenous compounds having effective fertilizing value. As is well-known atmospheric nitrogen has been utilized in the past by processes involving nitrogen fixation. Somewhat expensive, elaborate, and heavy electro-mechanical apparatus has been employed in the past to develop a widely spread arc or flame thereby to heat a large quantity of the nitrogen and oxygen in a predetermined quantity of air. Because of the electrical power required to spread the arc, this prior art method and apparatus is too expensive and has been used only to a minor extent. Other processes have been developed but are also expensive and require complex apparatus.

The subject invention is essentially a method and apparatus for producing carbon dioxide accompanied or unaccompanied by fixed nitrogen, dissolving the gaseous materials in water, and employing the resuling aqueous solution as a treating liquid. Such liquid is excellently suited for use in treating alkaline soils for reducing their alkaline content and fertilizing the same but it is not to be so limited in application; for example, pumps which have become clogged with alkaline crusts may be cleaned by the subject liquid. Other uses will be evident as the description proceeds.

Accordingly, it is an object of the present invention to provide a method and apparatus for producing a treating liquid for alkaline soils and the like.

Another object is to provide an apparatus for producing carbon dioxide for farm use on an economically feasible basis.

Another object is to provide such an apparatus adapted for the fixation of nitrogen.

Another object is to reclaim alkaline soils in an economical manner.

Another object is to provide a method for the treatment of alkaline soils to minimize the active sodium ion content, to neutralize or acidulate the soil, and to increase the permeability of the soil.

Another object is to improve the aggregate structure of a soil.

Another object is to minimize the tendency of certain alkaline soils to deflocculate and compact.

Another object is to provide an apparatus for producing carbon dioxide gas and for fixing nitrogen substantially simultaneously.

Another object is to provide a treating liquid for releasing calcium ions in such manner that they can readily displace the sodium ions in base exchange compounds which have a deleterious effect in soils, deep well pumps, and the like.

Another object is to provide a combustion chamber in which temperatures are developed sufficient for effectively and economically producing carbon dioxide gas and fixing nitrogen from the atmosphere.

These, together with other objects, will become more fully apparent upon reference to the following description.

In the drawings:

FIG. 2 is a somewhat enlarged longitudinal section through the housing taken on line 2—2 of FIG. 1.

FIG. 3 is a somewhat enlarged fragmentary cross section of the housing although taken on a plane at right angles to the plane of FIG. 2.

FIG. 4 is a transverse section taken on line 4—4 of FIG. 1.

Figure 1:
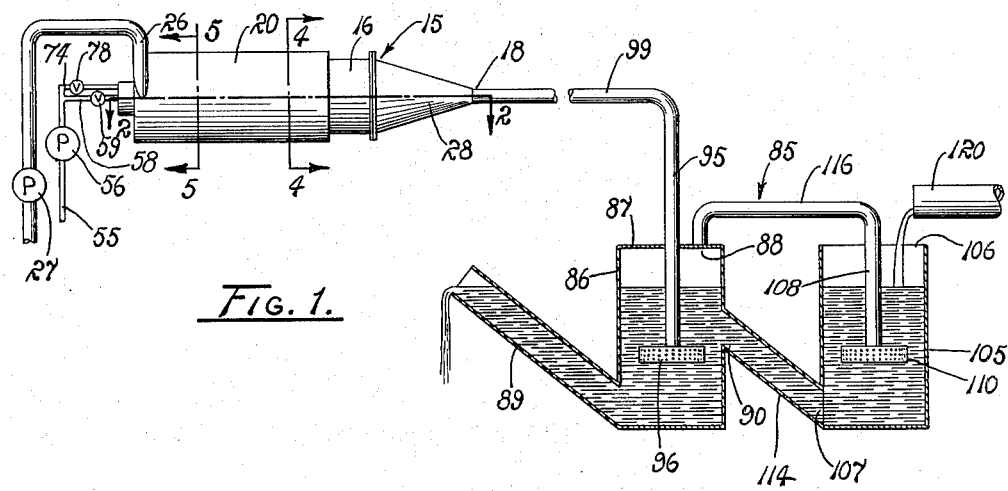
FIG. 1 is a side elevation of a gas producing housing and a cross section through a gas stripping device embodying the principles of the present invention.
Figure 5:
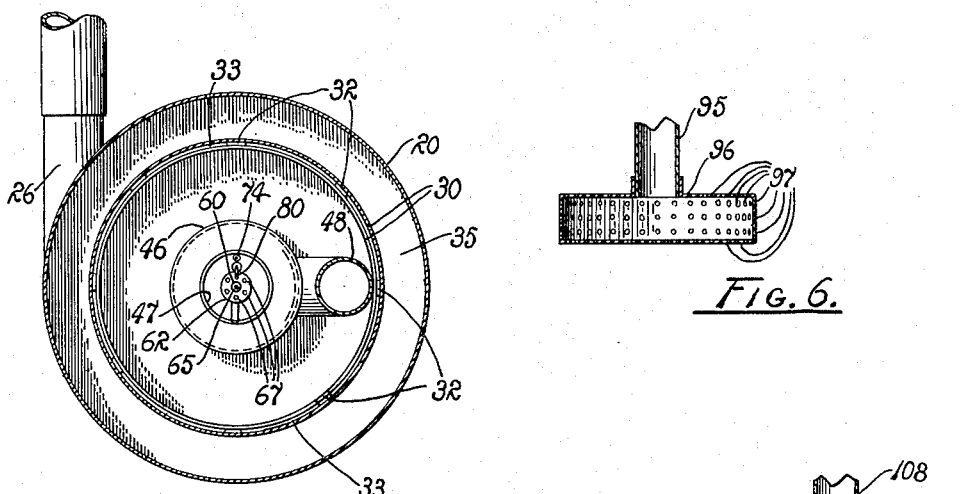
FIG. 5 is a transverse section taken on line 5—5 of FIG. 1.

Referring more particularly to the drawings, the subject apparatus includes an elongated gas producing tubular housing or furnace 15 having an elongated annular side wall 16 providing a relatively forward gas outlet 18. The housing also includes an outer circumferentially extended, cylindrical jacket 20 secured to the side wall adjacent to its forward end and longitudinally, substantially coaxially extended rearwardly of the side wall in circumferentially spaced relation thereto. The housing provides an inlet or rear end wall 22 connected to the jacket at the rear end of the housing and opposite to the gas outlet.

An air inlet pipe 26 is tangentially connected to the jacket 20 adjacent to the end wall 22, and a blower 27 is connected in the pipe for forcing air into the jacket under pressure, preferably of approximately 2.8 pounds per square inch above atmospheric pressure, and at a velocity of preferably about three-hundred and sixty cubic feet per minute. It is to be noted that the side wall 16 includes a conical outlet section 28 tapering to the gas outlet 18 and a plurality of annular louvers 30 interconnected in marginally overlapped, circumferentially spaced, concentric relation, with opposite endmost louvers respectively rigidly connected to the outlet section and to the end wall 22. The louvers are of substantially uniformly progressively increased diameter from the end wall to the outlet 18. The louvers are preferably marginally interconnected by beads 32 of welding material so as to provide substantially continuous annular openings 33 between the louvers.

The side wall 16 encloses a combustion chamber 34, and the jacket 20 encircles the louvers 30 and provides an annular insulating compartment 35 between the jacket and the louvers. Air is forced into the compartment through the air inlet pipe 26 whereby it travels in a whirling movement about the louvers and longitudinally forwardly of the louvers. It will be evident that portions of the air pass through the openings 33 between the louvers and into the combustion chamber in a succession of overlapping cylindrical air layers along the interior of the louvers.

A plurality of primary, upper and lower, transversely extended and transversely spaced, feed-back heating tubes 40 are interconnected in staggered relation by angularly related, transversely extended, secondary feed-back heating tubes 41. The lower primary feed-back tubes are supported in the combustion chamber 34 on stirrups 42 connected to the forwardmost louver 30 of the side wall. The stirrups have upwardly disposed sockets receiving the tubes. The rearwardmost lower primary heating tube has an inlet 44 opening into the compartment 35 and thus admits air from the compartment into said rearwardmost heating tube for travel through the heating tubes and eventually to the forwardmost upper primary heating tube.

The housing 15 also includes an elongated rear tubular preheating section 46 coaxially mounted in the inlet end wall 22 and extended forwardly into the combustion chamber 34 and, more specifically, within a portion of the length of the rearwardmost louver 30. The preheating section provides a forward outlet opening 47 disposed concentrically within the combustion chamber. An elongated feedback conduit 48 interconnects the forwardmost upper primary heating tube 40 and the preheating section 46 for conveying the air from the heating tubes into the preheating section and through the outlet opening into the combustion chamber. The preheating section actually forms an outlet portion of the feed-back conduit.

The apparatus of the present invention also includes a fuel supply line 55 adapted for connection to a source of carbonaceous fuel, such as diesel oil, or the like, not shown. A fuel pump 56 is connected in the supply line. A fuel duct 58 having a valve 59 therein is substantially coaxially extended through the preheating section 46 and has an outlet end extended within the outlet opening 47. A liquid spray nozzle 60 is connected to the outlet end of the fuel duct, has an outlet orifice directed into the combustion chamber 34, and is adapted to eject a fine, diffused spray of fuel into the combustion chamber.

A tubular vapor casing 62 is concentrically mounted within the preheating section 46, also extends into the outlet opening 47, and is in circumferentially spaced, enclosing relation to the fuel duct 58 and the spray nozzle 60. The vapor casing has an outlet end wall 64 providing a central fuel orifice 65 in registration with the outlet orifice of the spray nozzle and a plurality of vapor holes 67 around the fuel orifice and establishing communication between the vapor casing and the combustion chamber 34 for releasing hot gaseous vapors into the combustion chamber from the casing in a manner to be described hereinafter.

An elongated vapor duct 74 has an end connected in fluid communication with the fuel supply line 55 and is longitudinally extended through the preheating section 46. The vapor duct provides a U-shaped reversely curved section 75 forwardly extended through the outlet opening 47 in the preheating section and into the combustion chamber 34 and thence rearwardly to an opposite end 77 connected in gaseous communication with the vapor casing 62 rearwardly of the spray nozzle 60. A valve 78 is provided in the vapor duct.

An elongated electrode 80 is also extended within the preheating section 46 alongside of the vapor casing 62 and provides a tip in adjacent spaced relation to the spray nozzle 60 within the combustion chamber 34. The electrode is adapted for connection to a source of electrical voltage, not shown, but in a manner believed to be well-known. Upon application of voltage to the electrode, a spark is developed between the electrode and the vapor casing 62 which is at ground potential. Other forms of igniting devices may be employed as will be evident.

Figure 6:
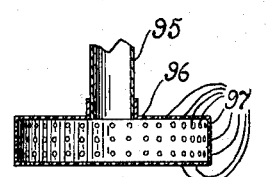
FIG. 6 is a somewhat enlarged cross section of a diffusion head employed in the gas stripping device.
Figure 7:
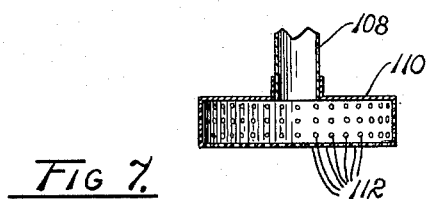
FIG. 7 is a cross section of another diffusion head employed in the gas stripping device.

With particular reference to FIGS. 1, 6 and 7, a gas stripping device 85 forming a part of the subject apparatus, is shown. This device includes a primary tank 86 which has an upper wall 87 providing a gas outlet 88, a lower treating liquid outlet 89, and a liquid inlet 90.

A gas inlet tube 95 is extended downwardly through the upper wall 87 of the primary tank 86, and a diffusion head 96, providing a plurality of perforations 97 in the upper, lower, and side walls thereof, is connected to a lower end of the tube within the primary tank. A gas delivery conduit 99 interconnects the gas outlet 18 of the housing 15 and the inlet tube.

A secondary tank 105 provides an open top 106, and a lower liquid outlet 107. A gas inlet tube 108 is also extended downwardly into the secondary tank through the open top thereof, and a diffusion head 110 is connected to a lower end of the tube 108 within the tank. This diffusion head, however, has an imperforate upper wall and is provided with perforations 112 only in the side and lower walls thereof. A liquid transfer conduit 114 interconnects the liquid outlet of the secondary tank and the liquid inlet 90 of the primary tank 86. Further, a gas transfer tube 116 has an end connected to the gas outlet 88 in the upper wall 87 of the primary tank and an opposite end connected to the inlet tube 108 for the secondary tank. A water supply conduit 120 is provided having an inlet end, not shown, connected to a source of water under pressure and an outlet end disposed above the open top 106 of the secondary tank 105 for delivering water to the secondary tank. The water is at normal well or environmental temperature and is thus relatively cold with respect to the housing temperature.

Operation

The operation of the described embodiment and the method of the subject invention are briefly summarized at this point. In this regard reference is conveniently made first to the use of the subject method and apparatus for reclaiming alkaline soils. Accordingly, the outlet 89 is connected to an irrigation pipe or is otherwise located so as to deliver the treating liquid from the primary tank 86 into a field for irrigation purposes.

The valves 59 and 78 in the fuel and vapor ducts 58 and 74, respectively, are opened to deliver fuel under pressure to the spray nozzle 60 and through the vapor duct. Voltage is applied to the electrode 80 to create an electric arc and thereby to ignite the spray of fuel from the nozzle. The fuel duct, the spray nozzle, the electrode, the vapor duct and the vapor casing thus constitute a burner. A flame is projected by the burner forwardly longitudinally within the combustion chamber 34 so as to envelop the reversely curved portion of the vapor duct. As the same time, air is introduced into the insulating compartment 35 under pressure, as described above, and at a predetermined velocity so that the air is passed into the combustion chamber 34 through the openings 33 to form overlapping, successive layers of air along the louvers 30 to cool them and to minimize their oxidation and other heat damage. This air also enters the feed-back tubes 40 and 41 through the inlet 44 and is conveyed through the feed-back conduit 48 into the preheating section 46 and thereby passes around the vapor duct 74 and into the combustion chamber 34.

Because the feed-back tubes 40 and 41 and the conduit 48 are located in the combustion chamber 34 in the path of the flame, the air passing therethrough is heated. Hot air is thus blown into the preheating section thereby to preheat the fuel entering into the vapor duct 74 and the fuel duct 58 from the fuel supply line 55. Further, since the reversely curved section 75 of the vapor duct is also located in the combustion chamber and immediately in front of the spray nozzle 60, the fuel in the vapor duct is vaporized so that vapor is introduced into the casing 62. This vapor is ejected through the holes 67 into the combustion chamber thereby to feed the flame and maintain combustion. The hot air entering the combustion chamber through the opening 47 also provides an excess of oxygen to assist combustion. Because of the heat of the returning air entering the preheating section 46, especially after the apparatus has been in operation for a period of time, the fuel passing through the fuel duct 58 is also vaporized before being ejected through the spray nozzle 60 further to facilitate and maintain combustion. The air in the compartment 35 completely circumscribes the louvers 30 of the side wall 16 and forms an insulating barrier tending to retain heat within the combustion chamber.

Two chemical reactions which occur in the combustion chamber 34 are to be noted. Firstly, because of the combustion of the fuel in the presence of oxygen supplied by the air entering the combustion chamber through the outlet opening 47 and also through the openings 33 from the compartment 35, carbon dioxide is produced. It is to be noted at this point that the temperatures produced in commercial embodiments of the subject invention approximate three-thousand three-hundred degrees Fahrenheit in the combustion chamber. Thus, and considering that the flame is projected from the spray nozzle 60 substantially the full length of the housing, it will be appreciated that carbon dioxide produced from combustion is blown out of the gas outlet 18 in the housing.

Secondly, the temperature condition described in the combustion chamber 34 is fully adequate to support fixation of nitrogen in the air forced into the combustion chamber as described. Thus, the nitrogen and the oxygen in this air combine in the hot environment of the combustion chamber to produce gaseous nitric oxide which is also forced out of the gas outlet of the housing with the carbon dioxide gas.

Immediately as they are produced, the gaseous products of combustion and fixation of nitrogen are forced downwardly through the inlet gas tube 95 and outwardly through the perforations 97 in the diffusion head 96 into the water in the primary tank 86. The gases are bubbled upwardly through the water and in so doing, are partially dissolved in the water and immediately cooled to maintain nitrogen fixation. Some of the gas escapes, however, and is taken off through the gas transfer tube 116 and carried downwardly through the inlet gas tube 108 into the liquid in the secondary tank 105. However, because the perforations 112 are located only in the lower wall of the diffusion head 110, the gas is forced downwardly from the diffusion head and from there bubbles upwardly through the liquid. More of the gaseous mixture is dissolved in the liquid in the secondary tank but still some escapes upwardly through the open top thereof and is lost to the atmosphere. A substantial amount of the gas produced in the gas housing 15 is, however, dissolved in the liquid in either the primary or the secondary tank. The liquid from the secondary tank is conveyed into the primary tank through the transfer conduit 114, and an aqueous solution of carbon dioxide and nitrous oxide is discharged from the primary tank through the treating liquid outlet 89. Actually, this is a very weak aqueous solution of carbonic and nitric acids.

The treating liquid discharged from the primary tank 86 is applied to soil to be treated. The carbonic acid reacts with the free carbonate in the soil thereby destroying it and effectively lowering tthe pH value of the soil to bring about the acidulation of the soil. The carbonic acid also reacts with the calcium carbonate in the alkaline soil and releases the calcium ions which effectively displace sodium ions in the base exchange compounds in the soil. The free sodium ions are then carried away as a result of excess irrigation water moving downwardly in the soil. The nitrogenous compound in the irrigation water is also added to the soil and is effective as a fertilizer.

The treating liquid from the primary tank 86 has also been found to be useful in treating pipe casings for water wells. Frequently, the perforations in a deep water well casing are clogged with alkaline crusts so water cannot get in the well. In the past, it has been necessary every twenty or thirty days to clean out the perforations by scraping or breaking the crusts which have collected on the metal casings. It has been found that by adding the treating liquid of the present invention to the water in the well below the level of the casing affected, that the perforations are cleaned and unclogged. Other applications of the subject invention will be immediately apparent to those skilled in the art.

In summary, a method and apparatus has been provided for producing a treating liquid which includes a dilute or weak aqueous solution of carbonic and nitric acids. The invention provides for the production of carbon dioxide and the fixation of nitrogen in an economical and simple manner so as to make the method and apparatus of the subject invention practical for use on a wide scale in reclaiming vast acreages of alkaline land. As noted above, however, the invention has other applications. In the amendment of alkaline soils, however, it has been found that after the soil has been treated with the subject liquids, the penetrability of the soil has been increased so that a given quantity of water will only flood thirty acres after treatment as compared to forty acres before treatment. Not only is soil permeability improved but the soil particles are flocculated into desired aggregates and the alkalinity is neutralized.

Although the invention has been herein shown and described in what is conceived to be the most practical and preferred method and embodiment, it is recognized that departures may be made therefrom within the scope of the invention, which is not to be limited to the details disclosed herein but is to be accorded the full scope of the claims so as to embrace any and all equivalent methods, devices, and apparatus.

Having described our invention, what we claim as new and desire to secure by Letters Patent is:

1. A method of treating soils comprising spraying carbonaceous fuel under pressure into a combustion chamber, igniting the fuel spray to project an elongated flame into the chamber and through combustion to produce carbon dioxide gas, introducing air under pressure into the chamber circumferentially of the flame for supplying oxygen to the flame and for blowing said carbon dioxide gas toward an outlet for the chamber, passing said gas through an aqueous bath to provide a carbonic acid solution, and applying said solution to the soil to be treated.

2. The method of claim 1 including the step of enveloping said combustion chamber with air, confining and conducting said enveloping air under pressure initially into the path of the flame and thereafter exhausting said air into the chamber in the direction of and around the flame to maintain combustion and to blow the gases toward said outlet and whereby heat is contained in the chamber and the temperature is maintained above about three-thousand degrees F. to promote fixation of nitrogen in the air as well as to produce said carbon dioxide gas, and maintaining said bath at environmental temperature to cool the gases passing therethrough.

3. The method of claim 1 wherein said passing step is conducted while the gas retains its heat of combustion and includes percolating said gas through a first aqueous bath whereby some of the gas is dissolved and some of the gas bubbles escape from said first bath, collecting said escaping gas and percolating the same through a second aqueous to dissolve more of the gas in water of the second bath, transferring the gaseous solution from the second bath to the first bath, and applying the solution in said first bath to soil to be reclaimed.

4. An apparatus for producing carbon dioxide gas and for fixing nitrogen in the air comprising an elongated furnace housing having an annular wall circumscribing a combustion chamber, a rearward end, an opposite forward end having a gas outlet, and an annular jacket mounted in circumferentially spaced circumscribing relation on the annular wall to provide an annular insulation compartment between the wall and the jacket; a burner mounted in the rearward end of the housing for projecting an elongated flame forwardly in the combustion chamber toward said outlet, said wall having a circumferentially extended opening intermediate said forward and rearward ends providing communication between the combustion chamber and the insulation compartment and adapted to circumscribe the flame; a blower connected to the jacket for blowing air into the compartment so as to envelop the wall with a layer of air to retain heat in the chamber and for blowing air into the chamber through the opening and around the flame to sustain combustion, to protect the wall interiorly thereof from the flame, and to blow gases produced by such combustion through said outlet, said burner including a spray nozzle having an outlet orifice directed into the combustion chamber; a vapor casing circumscribing the spray nozzle and providing an orifice in registration with the outlet orifice of the nozzle and a plurality of vapor holes around the orifice; an elongated vapor duct having an outlet end connected to the vapor casing and a section extended into the chamber in forwardly adjacent spaced relation to the nozzle; means for supplying fuel under pressure to the spray nozzle and to the vapor duct wherein a spray of fuel is projected into the chamber from the nozzle; and means for creating an electric spark in the spray of fuel to ignite the same and produce said flame thereby to vaporize the fuel in said section of the vapor duct whereby vapor is fed into the vapor casing and through the vapor holes into the chamber around the flame.

5. The apparatus of claim 4 wherein the housing includes a preheating section enclosing the vapor casing and providing an opening circumscribing the spray nozzle and receiving the extended section of the vapor duct, and wherein a gas heating conductor is supported by the wall and is disposed forwardly in the combustion chamber in the path of the flame, the conductor having an inlet end connected to the insulation compartment for receiving air therefrom to be further heated while passing through the conductor, and an outlet end connected to the preheating section.

6. A carbon dioxide generator comprising a substantially cylindrical jacket, a succession of substantially cylindrical louvers mounted concentrically within the jacket so as to provide an air compartment between the louvers and the jacket, successive louvers being of progressively increasing diameter and in overlapping relation to their respective preceding louvers defining annular air openings therebetween, means mounted in an end of the jacket for projecting a spray of fuel longitudinally substantially concentrically thereof within the louvers and in the direction of increasing diameter of the succession of louvers, means mounted within the jacket for igniting the fuel, a conduit connected tangentially to the jacket adjacent to the end thereof of the fuel projecting means and communicating with the air compartment, means for supplying air under pressure to the conduit whereby air is forced in a whirling spiral about the louvers and projected through the annular openings in a succession of overlapping cylindrical air layers along the interior of the louvers, and hot air conduit means connected to the air compartment and disposed transversely of the louvers at the end of the jacket opposite to the fuel projecting means so as to be disposed in the flame resulting from ignition of the fuel, said hot air conduit means extending longitudinally of the jacket and having an open end substantially concentrically of the fuel projecting means and disposed in the same direction thereof.

7. An apparatus for reclaiming alkaline soil by reducing exchangeable sodium in the soil and by addition of nitrogen to the soil comprising an elongated furnace housing having an annular wall circumscribing a combustion chamber, a rearward end, and an opposite forward end having a gas outlet; a burner mounted in the rearward end of the housing for projecting an elongated flame forwardly in the combustion chamber toward said outlet, the wall having a circumferentially extended opening intermediate said forward and rearward ends for circumscribing the flame; means for blowing air into the chamber through the opening and around the flame to protect the wall interiorly thereof from the flame and to blow carbon dioxide and nitric oxide gases produced by such combustion and fixation through said outlet; primary and secondary tanks, the primary tank having an upper wall providing a gas outlet; means for supplying water to said secondary tank; a liquid transfer conduit interconnecting the tanks and transferring liquid from the secondary tank to the primary tank; a first gas inlet tube connected to the outlet of the housing and having a gas outlet diffusion head immersed in the liquid in the primary tank for bubbling gas into such liquid whereby some of the gas is dissolved in the liquid and some of the gas rises from the surface of the liquid in the primary tank, and a second gas inlet tube connected to the gas outlet in the upper wall of the primary tank and having a gas outlet diffusion head immersed in the liquid in the secondary tank for bubbling gas released from the liquid in the primary tank through the liquid in the secondary tank thereby to dissolve more of said gas in the liquid so as to produce a weak solution of carbonic and nitric acids, and the primary tank having an outlet for discharging said acidic solution for application to soil to be reclaimed.

8. A method of treating alkaline materials containing sodium ion base exchange compounds comprising applying carbonic acid to the base exchange compounds to release sodium ions, said carbonic acid being applied in the presence of water in sufficient excess to flow, and carrying the released sodium ions away in the flow of the excess water.

9. A method of amending alkaline soil comprising applying irrigation water containing carbonic acid to the soil whereby sodium ions are released from base exchange compounds of the soil, said irrigation water being applied in sufficient excess to flow and carrying said released sodium ions away in the flow of the excess irrigation water.

10. A method of amending alkaline soil containing calcium carbonate and base exchange compounds containing sodium ions comprising flowing irrigation water containing carbonic acid over the soil whereby the carbonic acid reacts with the calcium carbonate to release calcium ions which displace sodium ions in the base exchange compounds in the soil, and carrying the released sodium ions away in said irrigation water.

11. A method of treating soils comprising projecting carbonaceous fuel into a combustion chamber having an outlet, igniting the fuel to project a flame into the chamber and through combustion to produce carbon dioxide gas, introducing air into the chamber circumferentially of the flame for supplying oxygen to the flame and for conducting said carbon dioxide gas toward the outlet for the chamber, passing said gas into an aqueous bath to provide a carbonic acid solution, and applying said solution to the soil to be treated.

12. The method of claim 11 including the step of externally enveloping said combustion chamber with air, confining and conducting said enveloping air into the path of the flame to preheat the same and thereafter discharging said preheated air into the chamber to maintain and to conduct the gases toward said outlet.

13. The method of claim 11 wherein said passing step is conducted while the gas retains its heat of combustion and said step further includes percolating said gas through said aqueous bath whereby a portion of the gas is dissolved and a remaining portion of the gas bubbles through the bath and escapes, collecting said escaping gas and percolating the same through said aqueous bath a second time to dissolve more of the gas in water of the aqueous bath, and applying the solution in said bath to soil to be reclaimed.

14. An apparatus for producing carbon dioxide gas comprising an elongated furnace housing having an annular wall circumscribing a combustion chamber, a rearward end, an opposite forward end having a gas outlet, and an annular jacket mounted in circumferentially spaced circumscribing relation on the annular wall to provide an insulation compartment between the wall and the jacket; a burner mounted in the rearward end of the housing for projecting an elongated flame forwardly in the combustion chamber toward said outlet, said wall having a circumferentially extended opening intermediate said forward and rearward ends providing communication between the combustion chamber and the insulation compartment and adapted to circumscribe the flame; means for supplying air to the compartment so as to envelop the wall with a layer of air to retain heat in the chamber and for introducing air into the chamber through the opening and around the flame to sustain combustion, to protect the wall interiorly thereof from the flame, and to conduct gases produced by such combustion through said outlet, said burner including a fuel injector having an outlet directed into the combustion chamber; a casing circumscribing said injector and providing a plurality of openings adjacent to said outlet in the injector; and elongated duct having an outlet end connected to said casing and a section extended into the chamber in forwardly adjacent spaced relation to the injector; means for supplying fuel to the injector and to the duct wherein fuel is injected into the chamber from the injector; and means for creating an electric spark adjacent to the fuel to ignite the same to preheat the fuel in said section of the duct whereby the fuel is fed into the casing and through said openings therein into the chamber adjacent to the flame.

15. An apparatus for producing carbon dioxide gas and for fixing nitrogen in the air comprising an elongated furnace housing having an annular wall circumscribing a combustion chamber, a rearward end, an opposite forward end having a gas outlet, and an annular jacket mounted in circumferentially spaced circumscribing relation on the annular wall to provide an annular insulation compartment between the wall and the jacket; a burner mounted in the rearward end of the housing for projecting an elongated flame forwardly in the combustion chamber toward said outlet, said wall having a circumferentially extended opening intermediate said forward and rearward ends providing communication between the combustion chamber and the insulation compartment and adapted to circumscribe the flame; means for supplying air into the compartment so as to envelop the wall with a layer of air to retain heat in the chamber and for introducing air into the chamber through the opening and around the flame to sustain combustion, to protect the wall interiorly thereof from the flame, and to conduct gases produced by such combustion through said outlet, said burner including a fuel injector having an outlet directed into the combustion chamber; a casing circumscribing said injector and providing a plurality of holes adjacent to said outlet in the injector; and elongated duct having an outlet end connected to said casing and a section extended into the chamber in forwardly adjacent spaced relation to the injector; means for supplying fuel to the injector and to the duct wherein fuel is injected into the chamber from the injector; and means for creating an electric spark adjacent to the fuel to ignite the same and produce said flame thereby to preheat the fuel in said section of the duct whereby the fuel is fed into the casing and through said holes therein into the chamber adjacent to the flame, said housing including a preheating section enclosing the casing and providing an opening circumscribing the injector and receiving the extended section of the duct, and wherein a gas heating conductor is supported by the wall and is disposed forwardly in the combustion chamber in the path of the flame, the conductor having an inlet end connected to the insulation compartment for receiving air therefrom to be further heated while passing through the conductor, and an outlet end connected to the preheating section.

16. An apparatus for reclaiming alkaline soil by reducing exchangeable sodium in the soil comprising an elongated furnace housing having an annular wall circumscribing a combustion chamber, a rearward end, and an opposite forward end having a gas outlet; a burner mounted in the rearward end of the housing for projecting an elongated flame forwardly in the combustion chamber toward said outlet, the wall having a circumferentially extended opening intermediate said forward and rearward ends for circumscribing the flame; means for supplying air to the chamber through the opening and around the flame to protect the wall interiorly thereof from the flame and to conduct carbon dioxide gas produced by such combustion through said outlet; a tank having an upper wall providing a gas outlet; means for supplying water to said tank; a gas inlet tube connected to the outlet of the housing and having a gas outlet diffusion head immersed in the liquid in the tank for bubbling gas into such liquid whereby a portion of the gas is dissolved in the liquid and a remaining portion of the gas rises from the surface of the liquid in the tank, and a second gas inlet tube connected to the gas outlet in the upper wall of the tank and having a gas outlet diffusion head immersed in the liquid in the tank for bubbling gas released from the liquid through the liquid a second time thereby to dissolve the remaining portion of said gas in the liquid so as to produce a solution of carbonic acid, and the tank having an outlet for discharging said acidic solution for application to the soil to be reclaimed.

References Cited in the file of this patent

UNITED STATES PATENTS

| | | |
|---|---|---|
| 1,023,422 | d'Espujols | Apr. 16, 1912 |
| 1,122,923 | Heine | Dec. 29, 1914 |
| 2,088,869 | Porter | Aug. 3, 1937 |
| 2,452,779 | McCollum | Nov. 2, 1948 |
| 2,477,584 | De Zubay | Aug. 2, 1949 |
| 2,936,548 | Morrison | May 17, 1960 |

FOREIGN PATENTS

| | | |
|---|---|---|
| 596,789 | France | Aug. 17, 1925 |
| 560,063 | Germany | Sept. 28, 1932 |
| 104,734 | Great Britain | Mar. 15, 1917 |